(12) United States Patent
Warman et al.

(10) Patent No.: US 11,823,408 B2
(45) Date of Patent: Nov. 21, 2023

(54) APPARATUS AND METHOD TO QUANTIFY MAIZE SEED PHENOTYPES (71) Applicant: Oregon State University, Corvallis, OR (US)

(72) Inventors: Cedar Warman, Corvallis, OR (US); John E. Fowler, Corvallis, OR (US)

(73) Assignee: OREGON STATE UNIVERSITY, Corvallis, OR (US)

(*) Notice: Subject to any disclaimer, the term of this patent is extended or adjusted under 35 U.S.C. 154(b) by 222 days.

(21) Appl. No.: 17/195,446

(22) Filed: Mar. 8, 2021

(65) Prior Publication Data

US 2021/0287392 A1 Sep. 16, 2021

Related U.S. Application Data

(60) Provisional application No. 62/989,403, filed on Mar. 13, 2020.

(51) Int. Cl.
*G06T 7/70* (2017.01)
*G06T 7/90* (2017.01)
(Continued)

(52) U.S. Cl.
CPC ............. *G06T 7/70* (2017.01); *G06T 7/0004* (2013.01); *G06T 7/11* (2017.01); *G06T 7/90* (2017.01);
(Continued)

(58) Field of Classification Search
CPC . G06T 7/70; G06T 7/0004; G06T 7/11; G06T 7/90; G06T 11/00;
(Continued)

(56) References Cited

U.S. PATENT DOCUMENTS

2016/0093037 A1* 3/2016 Spalding .................. G06T 7/62
382/110
2016/0225135 A1* 8/2016 Young ....................... G06T 7/11
(Continued)

FOREIGN PATENT DOCUMENTS

CN 101853524 A * 10/2010
CN 101881598 A * 11/2010
(Continued)

OTHER PUBLICATIONS

Ardvisson, S. et al., "A growth phenotyping pipeline for *Arabidopsis thaliana* integrating image analysis and rosette area modeling for robust quantification of genotype effects", New Phytol. Aug. 2011;191(3):895-907. doi: 10.1111/j.1469-8137.2011.03756.x. Epub May 13, 2011. PMID: 21569033.
(Continued)

*Primary Examiner* — Oneal R Mistry
*Assistant Examiner* — Vaisali Rao Koppolu
(74) *Attorney, Agent, or Firm* — MUGHAL GAUDRY & FRANKLIN PC (57) ABSTRACT

A maize ear scanning device and computer vision kernel counting pipeline is used to analyze a maize ear. The process of analyzing the maize ear comprises: placing the ear on a rotating motor, fastened at the top with a metal pin on the sliding portion of the scanner; starting the motor's rotation; capturing an image of rotating ear with camera; converting rotating ear video into flat image by extracting individual frames, cropping to center horizontal pixel row, and concatenating all pixel rows; and running computer vision pipeline on image to identify seed locations.

15 Claims, 9 Drawing Sheets

(51) Int. Cl.
*G06T 11/00* (2006.01)
*G06T 7/11* (2017.01)
*G06T 7/00* (2017.01)
*H04N 23/951* (2023.01)

(52) U.S. Cl.
CPC .......... *G06T 11/00* (2013.01); *H04N 23/951* (2023.01); *G06T 2207/10024* (2013.01); *G06T 2207/20132* (2013.01); *G06T 2207/30128* (2013.01); *G06T 2207/30242* (2013.01)

(58) Field of Classification Search
CPC . G06T 2207/10024; G06T 2207/20132; G06T 2207/30128; G06T 2207/30242; G06T 2207/10016; G06T 2207/20084; G06T 2207/20221; G06T 2207/30188; H04N 23/951; H04N 23/74; H04N 23/90; H04N 23/56; A01H 1/04; A01G 9/02; B65G 43/00; A01C 1/00
See application file for complete search history.

(56) References Cited

U.S. PATENT DOCUMENTS

| | | | | |
|---|---|---|---|---|
| 2017/0186177 | A1* | 6/2017 | Nagori | G06T 7/579 |
| 2018/0276818 | A1* | 9/2018 | Vander Velden | H04N 23/681 |
| 2019/0122073 | A1* | 4/2019 | Ozdemir | G06T 7/0012 |
| 2019/0236800 | A1* | 8/2019 | Ruelberg | G06Q 50/02 |
| 2020/0162668 | A1* | 5/2020 | Chazallet | H04N 23/80 |

FOREIGN PATENT DOCUMENTS

| | | | |
|---|---|---|---|
| CN | 202160400 U | * | 3/2012 |
| CN | 207185135 U | * | 4/2018 |
| CN | 110089307 A | * | 8/2019 |
| CN | 110490868 A | * | 11/2019 |

OTHER PUBLICATIONS

Arthur, K. et al., "Maize ROP2 GTPase provides a competitve advantage to the male gametophyte", GENETICS Dec. 1, 2003 vol. 165 No. 4. 2137-2151.

Awlia, M. et al., "High-Throughput Non-Destructive Phenotyping of Traits that Contribute to Salinity Tolerance in *Arabidopsis thaliana*", Frontiers in Plant Science, 28. vol. 7 Sep. 2016, 15 pages. https://doi.org/10.3389/fpls.2016.01414.

Bai, F. et al., "Parent-of-Origin-Effect rough endosperm Mutants in Maize", Genetics, vol. 204, Issue 1, Sep. 1, 2016, pp. 233-248, https://doi.org/10.1534/genetics.116.191833.

Chaivivatrakul, S., "Automatic morphological trait characterization for corn plants via 30 holographic reconstruction", Comput. Electron. Agric. 109: 109-123. (2014) DOI 10.1016/j.compag.2014.09. 005.

Choudhury, S. et al., "Automated vegetative stage phenotyping analysis of maize plants using visible light images. In KOO workshop on data science for food, energy and water", DS-FEW '16 Aug. 14, 2016, San Francisco, CA, USA.

Clark, R. et al., "High-throughput two-dimensional root system phenotyping platform facilitates genetic analysis of root growth and development", Plant Cell Environ. Feb. 2013;36(2):454-66. doi: 10.1111/j.1365-3040.2012.02587.x. Epub Sep. 3, 2012. PMID: 22860896.

* cited by examiner

APPARATUS AND METHOD TO QUANTIFY MAIZE SEED PHENOTYPES

CLAIM FOR PRIORITY

This application claims the benefit of priority to U.S. Provisional Patent Application No. 62/989,403, filed on Mar. 13, 2020, and which is incorporated by reference in entirety.

GOVERNMENT SUPPORT

This invention was made with government support under IOS-1340050, IOS-1832186, and IOS-1340112 awarded by the National Science Foundation. The government has certain rights in the invention.

BACKGROUND

High-throughput plant phenotyping is rapidly transforming crop improvement, disease management, and basic research. However, commercial phenotyping platforms remain out of reach for many laboratories, often requiring large initial investments of thousands or tens of thousands of dollars. While the cost of high-throughput sequencing has rapidly decreased, the cost of high-throughput phenotyping has remained high. New methods of low-cost, large-scale phenotyping are required to fully leverage the increasing availability of large datasets (e.g., genome sequences) and relevant quantitative statistical tools.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Scientists and farmers need to count corn. Specifically, the size, color, and location of corn seeds (properly called kernels) on the ear. This information (also known as phenotypes) can impact how a farmer grows their crops. Bigger seeds or more rows of seeds can be an important indicator of the health of a cornfield.

High-throughput phenotyping methods have been developed in several agricultural and model plant systems, including *Arabidopsis* and maize. *Arabidopsis* is well-suited to high-throughput phenotyping due to its small stature, rapid growth, and simple culture. Various systems have been created to measure *Arabidopsis* roots, rosettes, and whole plants. Most of these systems require robotic automation, which can drive up costs. Attempts at reducing costs rely on simple cameras and open-source image processing computational pipelines. Unlike *Arabidopsis*, maize plants are large, have a long growth cycle, and are typically grown seasonally outdoors. Because of these characteristics, maize is inherently more difficult to phenotype than *Arabidopsis*.

Among maize tissues, ears are another target of interest for high-throughput phenotyping. Ears, with the seeds they carry, contain information about the plant and its progeny. They are easily stored, and do not require phenotyping equipment to be in place in the field or greenhouse at specific times during the growing season. Ears are a primary agricultural product of maize, which has led the majority of previous phenotyping efforts to focus on aspects of the ear that influence yield, such as ear size, row number, and seed dimensions.

Beyond their agricultural importance, studying maize ears can answer fundamental questions about basic biology. The transmission of mutant genes can be easily tracked in maize seeds by taking advantage of a wide variety of visible endosperm markers, which can be genetically linked to a mutant of interest. On the ear, seeds occur as an ordered array of progeny, which allows the transmission of mutant alleles to be tracked not only by individual cross-section, but within individual ears. The transmission of marker genes has thus far been quantified by hand, either by counting seeds on ears or after they have been removed. This approach has several limitations, among them a lack of a permanent record of the surface arrangement of seeds on the ear. The same disadvantages apply to most high-throughput seed phenotyping methods, which generally rely on seeds being removed from the ear before scanning and do not typically include marker information.

For scientists, tracking colored seeds that signify changes in interesting genes can help them understand complex biological processes like sexual reproduction. Historically, the process of counting seeds and identifying their color has been a slow process, requiring a technician to count the seeds by hand. This process is time-consuming and expensive, and produces incomplete data. For example, if all the purple seeds on an ear are counted, the scientist knows the total number, but has no information about how close the seeds are to other seeds, or abundance of purple seeds on the top versus the bottom of the ear. Counting the seeds on each ear by hand produces no record of the ear, so once the ear is thrown away (a common practice due to limited space), no further data can be recorded from the ear.

Another approach is to manually count kernels with a cell counter, or marker and counting clicker. This approach uses a marker to mark previously counted kernels on the ear, in combination with a digital or mechanical counter to track the numbers of kernels counted. This approach is cost-effective and highly accurate. However, significant drawbacks include its slow speed, lack of positional data about individual kernels, and lack of permanent record of appearance of the ear.

Another approach is to count kernels by imaging the ear from only one side (for example, using a flat-bed scanner or a standard camera), then perform image processing to estimate kernel number or row number for the entire ear. While this approach is fast and effective for counting homogenous kernels, it lacks the ability to distinguish kernels that are highly contrasting, for example kernels with different colored seed markers. In addition, this approach only covers one surface of the ear, so the total seed count is an estimate. Previous imaging approaches have notably not categorized seed color markers (phenotypes).

Another approach is to count kernels and measure their shapes by removing them from the ear, then place them on a flatbed scanner, imaging platform, or conveyer belt. This approach is highly accurate for counting the number of kernels and observing characteristics of their shapes. However, removing kernels from the ear poses several drawbacks. Removing the kernels is a labor-intensive process that requires several extra steps when compared to imaging the kernels on the ear. In addition, any positional information about the kernels is lost once they are removed from the ear. Finally, when placed on a flat surface, kernels can be positioned in a variety of ways, in contrast to uniform positioning when the kernels remain on the ear.

Another approach is to X-ray image of the entire ear. This approach is highly accurate for determining seed size and number, but has severe drawbacks. It is prohibitively expensive for most labs, and is incapable of producing color images of the ear of the maize ear, so cannot be used to track color seed markers.

Various embodiments address the drawbacks of known approaches by using a maize ear scanning device and computer vision kernel counting pipeline. The embodiments address this missing aspect of high-throughput phenotyping in maize. In some embodiments, a rotational ear scanner and image processing pipeline is developed which is a cost-effective method for high-throughput ear phenotyping. By taking advantage of the cylindrical form of the maize ear, flat projections can be produced that provide a digital record of the surface of the ear, which can then be quantified in a variety of ways to track seed markers. In some examples, limiting materials to easily acquired parts and a basic camera makes this approach accessible to most if not all labs.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, power signal, magnetic signal, or data/clock signal. The meaning of "a," "an," and "the" include plural references. The meaning of "in" includes "in" and "on."

The term "scaling" generally refers to converting a design (schematic and layout) from one technology to another technology and subsequently being reduced in layout area.

The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

Figure 1A:
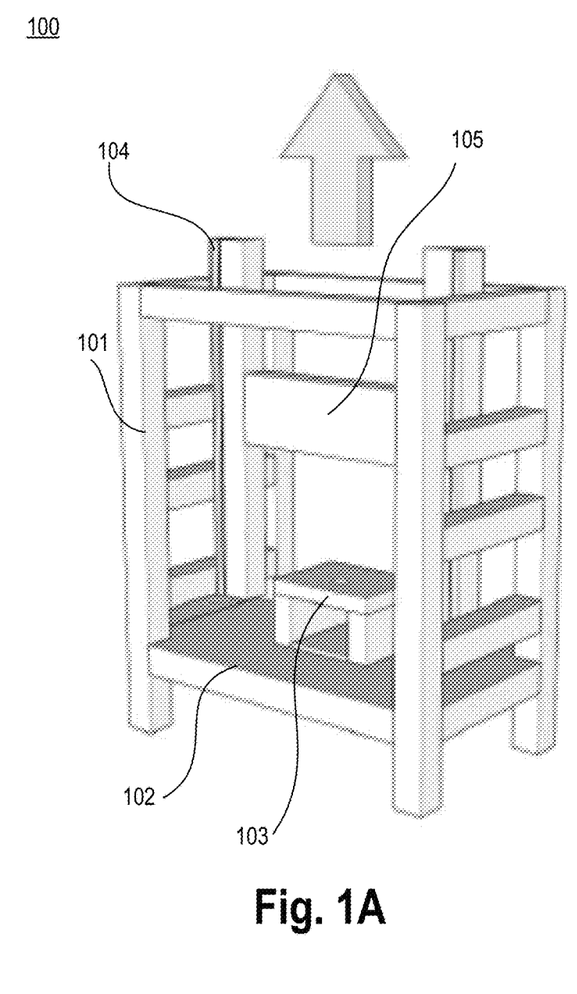
FIGS. 1A-B illustrate schematics of a rotational ear scanner in closed position (left) and open position (right), in accordance with some embodiments.
Figure 1B:
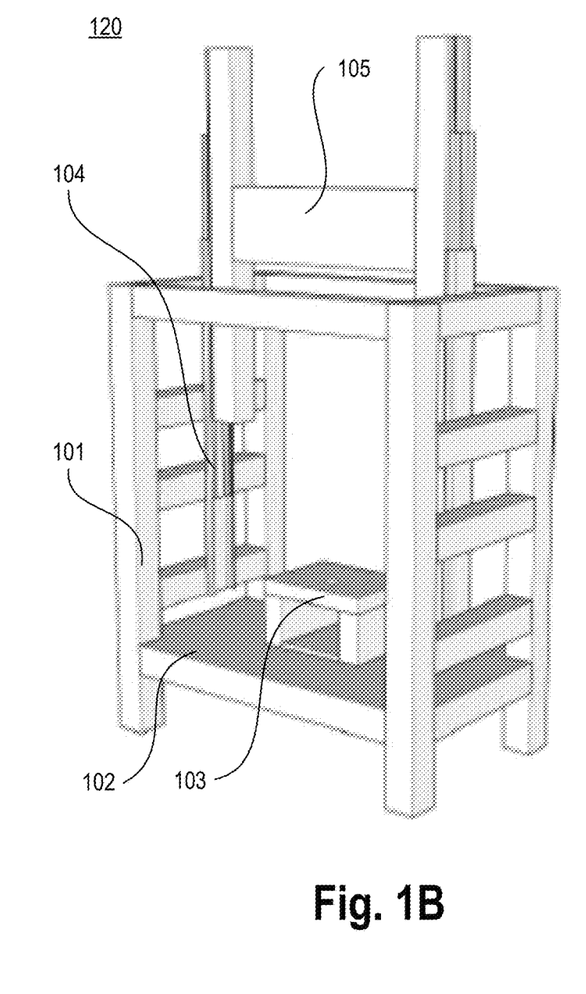

FIGS. 1A-B illustrate schematics of rotational ear scanner 100 in closed position (left) and open position (right) 120, in accordance with some embodiments. In some embodiments, rotational ear scanner 100 comprises a frame 101 having legs, a base 102, a pedestal 103, a sliding rail 104, a rack 105 on the sliding rails 104 coupled as shown. Frame 101 provides structural integrity for rotational ear scanner 100. While frame 101 is illustrated with four legs, it can have three legs (e.g., a tripod), or any other suitable configuration to provide a stable base 102. Base 102 supports pedestal 103. Pedestal 103 is used to provide support for a shaft and a housing for a motor to rotate the shaft along its axis. In some embodiments, sliding rail 104 allows rack 105 to slide along its rail. Rack 105 can thus move up and down along sliding rails 104, which are attached to frame 101. In some embodiments, sliding rail 104 allows for manual motion of the rack. In some embodiments, sliding rail 104 allows for motorized motion of rack 105. In one such example, a motor is coupled to a gear which rotates and causes a chain around the gear or coupled to the gear to move rack 105 along the sliding rail.

In various embodiments, a maize or any similar object is rotated along a shaft by a motor under pedestal 103. The shaft couples to the motor via a hole in the pedestal. By moving up rack 105, the maize is attached to the shaft. The shaft may pass through a hole through the center of the maize along its length. As such, the maize stands vertical relative to the base of pedestal 103.

To efficiently phenotype maize ears, in some embodiments a custom-built scanner is developed that is centered on a rotating ear. To scan an entire surface of the roughly cylindrical ear, the ear is rotated 360° along the shaft while a stationary camera records a video, which can then be processed into a cylindrical projection. Table 1 provides a set of materials that can be used to construct a cost-effective apparatus to scan an entire surface of the ear.

TABLE 1

| Material | Cost |
|---|---|
| Rotisserie motor (e.g., Minostar universal grill electric replacement rotisserie motor 120 V 4 Watt) | $22.99 |
| Drawer slides (e.g., Liberty D80618C-ZP-W 18-inch ball bearing drawer slides) | $11.94 |
| Pillow block bearing (e.g., Letool 12 mm mounted housing self-aligning pillow flange block bearing) | $3.75 |
| Lumber | $25.00 |
| Screws | $5.00 |
| Metal Rod | $5.00 |
| Tripod (e.g., AmazonBasics 60-inch Lightweight Tripod) | $23.49 |
| Camera (e.g., Sony DSCWX220) | $195.93 |
| Blue light (e.g., for GFP, Clare Chemical HL34T) | $590.00 |
| Orange light (e.g., for GFP, Neewer camera flash color gel kit) | $13.99 |
| Total cost, alternative system 1 (smartphone, full visible spectrum images) | $73.68 |
| Total cost, alternative system 2 (dedicated digital camera, light and filters for GFP imaging) | $897.09 |

In one example, the frame of the scanner is built from dimensional lumber, with a movable mechanism built from drawer slides that enables a wide range of ear sizes to be accommodated.

Figure 2:
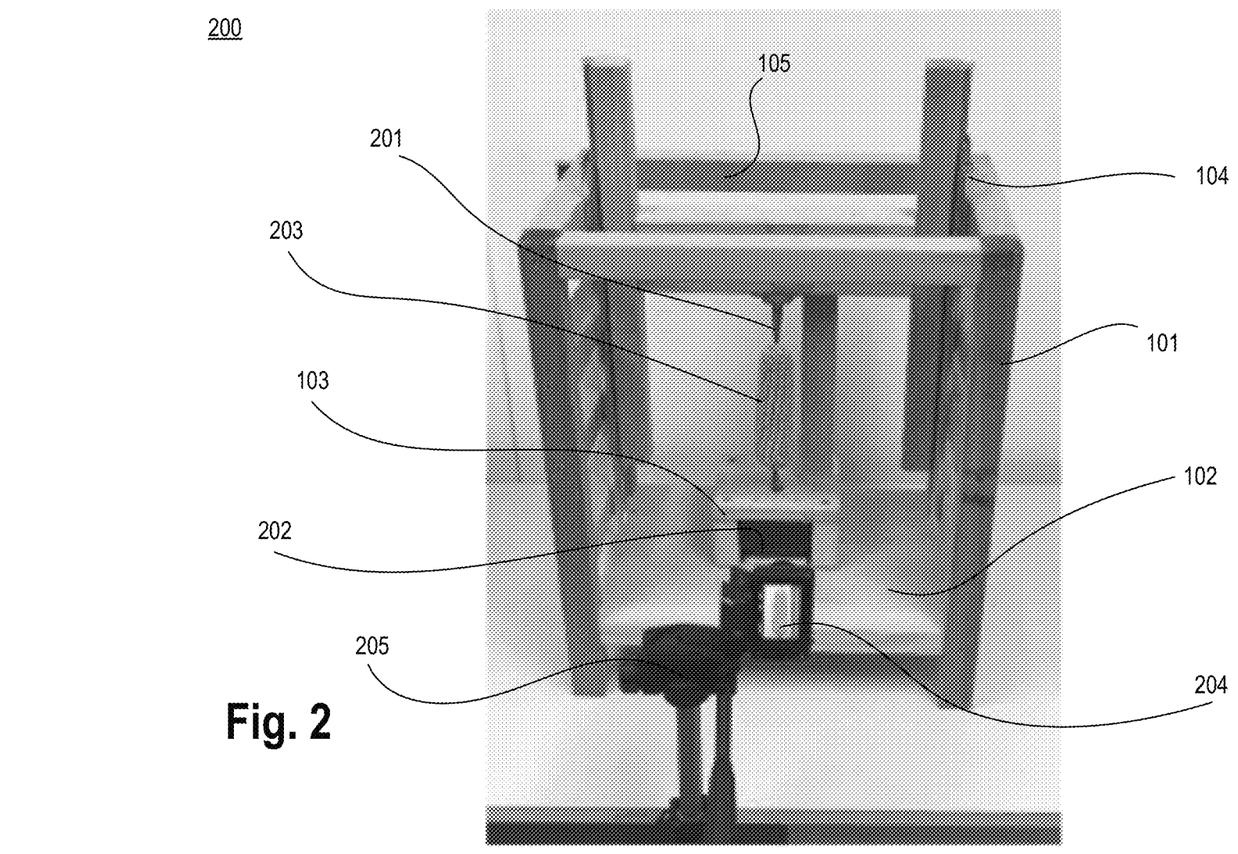
FIG. 2 illustrates an image of scanner with ear in place, in accordance with some embodiments.

FIG. 2 illustrates image 200 of scanner 100 with an ear in place, in accordance with some embodiments. Maize ears encode a vast amount of information. In agriculture, they provide insights into the value of a crop through yield and seed quality. In basic research, they open a window to molecular biology through mutant phenotypes and the transmission of seed markers. For example, assessing transmission rates of marked mutations on the maize ear (with seed populations of up to 600 progenies from a single cross) can generate statistically powerful data, which can then provide biological evidence for gene function during the haploid gametophyte phase.

Image 200 includes rotational ear scanner 100 with shaft 201 and motor 202 attached to shaft 201. A maize or ear 203 is attached to shaft 201. A camera 204 is positioned in front of ear 203 and affixed to an adjustable stand 205, with the ear centered in the frame. A video is captured as the ear spins through one full rotation, which is then processed to project the surface of the ear onto a single flat image, in accordance with some embodiments. While various embodiments illustrate an apparatus for rotating a single ear as shown, any suitable apparatus can be used that is able to controllably rotate one or more ears before one or more cameras. As such, one or more ears are processed using the scheme of various embodiments. For example, multiple ears may roll over a rolling conveyer belt (e.g., a number of rollers rotating in a controlled manner and in turn rotating multiple ears on them). Multiple cameras can then capture all portions of the rotating ears. In some embodiments, a single camera with variable frame rates can captures a number of frames for each ear, and then that data is processed according to the scheme of various embodiments.

The maize ear scanner apparatus in this example is built from dimensional lumber and widely available parts. It can be built using 3-D lumber. In this example, the base of the scanner is built from a nominal 2×12 (38×286 mm) fir board, while the frame of the scanner is built from nominal 2×2 (38×38 mm) cedar boards. Boards are fastened together with screws. Strict adherence to materials and exact dimensions of the scanner frame may not be necessary, as long as the scanner is structurally sound and large enough to accommodate ears of varying sizes. However, any material can be used to design rotational ear scanner 100.

Motor 202 may be a rotisserie motor that spins the ear at a constant speed, which is then imaged by digital camera 204 (e.g., a cell phone camera). In one example, the scanning process takes approximately 1 minute per ear, including the insertion of the ear into the scanner and video capture. For scanning ears carrying an engineered GFP marker that is highly expressed in the endosperm, ears are illuminated with a blue LED light with an orange filter placed in front of the camera. Other colored filers and lights may also be used.

In some embodiments, rotisserie motor 202 (e.g., Minostar universal grill electric replacement rotisserie motor, 120-volt 4 watt) is attached to base 102 of scanner apparatus 100 (or 200) by way of a wood enclosure. Rotisserie motors are widely available and require no specialized knowledge of electronics to use. If desired, the efficiency of the scanner could be improved by using a customized motor with programmable speed. A faster rotation speed may improve the overall scanning time, which is dependent on the frame rate of camera 204. The lower portion of the ear is fastened to rotisserie motor 202 using, for example, a 5/16" (8 mm) steel rod or shaft 201, which can be removed from motor 202 when switching ears. The top of steel rod or shaft 201 is grounded to a flattened point with a bench grinder to allow it to be inserted into the pith at the center of the base of the ear.

In this example, the top of ear 203 is held in place with an adjustable assembly constructed from a nominal 2×4 board (38×89 mm) fastened to drawer slides or rails 104 (e.g., Liberty D80618C-ZP-W 18-inch ball bearing drawer slides) on either side of the scanner frame. In the center of the 2×4, facing down towards the top of ear 203, is a steel pin mounted on a pillow block bearing (e.g., Letool 12 mm mounted housing self-aligning pillow flange block bearing). The steel pin (e.g., 12 mm) is sharpened to a point to penetrate the top of ear 203 as it is lowered, temporarily holding it in place as ear 203 is rotated during scanning. In various embodiments, the pin is part of shaft 201 or coupled to shaft 201. Because the pin can be moved up and down on the rails or drawer slides 104, a variety of ear sizes can be accommodated in the scanner.

In some embodiments, rod or shaft 201 is inserted into multiple ears. In one such example, multiple cameras are used, each directed towards an individual ear. As such, multiple ears are analyzed by a single motor. Likewise, multiple rods with multiple ears on them can be assembled and multiple cameras can be used to analyze each ear on each rod 201. In some embodiments, a simple computer, such as a Raspberry Pi can drive both configurable motor 202 and camera 204.

Camera 204 provides a number of scanned images, which together forms a video. The output of the scanner or camera 204 is a video of the rotating ear 203. This video could be directly quantified. For full spectrum visible light images, ambient lighting is used. To capture GFP fluorescence, a blue light (e.g., Clare Chemical HL34T) is used to illuminate the ear. An orange filter (e.g., Neewer camera flash color gel kit) is placed in front of the camera lens to partially filter out non-GFP wavelengths. More cost effective blue light illumination is possible (e.g. Wayllshine blue LED flashlight, $9.00). However, achieving sufficient brightness may be challenging without a higher power LED light.

The scanning process begins by trimming the top and bottom of ear 203 to expose the central pith. The bottom pin is then inserted into the bottom of ear 203, after which the pin with ear attached is placed in rotisserie motor 202. The top of ear 203 is secured by lowering the top pin into the pith at the top of ear 203. After turning on rotisserie motor 202, a video is captured by camera 204 that encompasses at least one complete rotation of ear 203. Ear 203 can then be removed from the scanner, and the next ear scanned.

In one example, a flat image projection may be most useful for visualizing an entire surface of ear 203, as well as for quantifying the distribution of seed markers. To produce this projection, in some embodiments, videos are first uploaded to a local computer and annotated with identifying metadata. Videos are annotated on a local computer or a cloud computing environment, followed by generation of the projection (flat image) via processing either on the same computer or on a high-performance computing cluster for speed improvements. Flat images are small in size, and can be quantified on a local computer or the cloud computing environment.

In some embodiments, videos are then transferred to a high-performance computing cluster (e.g., cloud) to be processed for generation of the projections; while this video processing step is more efficient on a computing cluster, it can alternatively be completed on a local computer. After processing, the resulting flat images are transferred back to a local computer or a cloud computing environment for assessment and quantification.

While the various embodiments largely focused on the need to count corn, the embodiments can also be used to address other types of needs and applications. For example, in one application, the apparatus and scheme of various embodiments can be used for measuring yield components from flat image projections. Maize yield is incredibly important for agriculture. With minimal modification, a computer vision pipeline can be incorporated to use the flat ear projections generated by the embodiments to estimate yield components such as seed size and row number. In another example, the embodiments are tailored to measure alternate seed and ear phenotypes to color. For example, the spaces between seeds can be measured from flat ear projections, which are relevant for the characterization of biological processes. Qualities of seeds such as a wrinkled surface, seed transparency, or hyperspectral images can all be obtained with minimal modification of the scanning system of various embodiments.

In another example, the embodiments can be used to examine the surface of other biological samples. For example, any roughly cylindrical object could be placed in the scanner and imaged. The surface of the object is then examined for desirable or undesirable qualities, colors, textures, etc. In another example, the embodiments can be used for quality control in manufacturing. Defects on the surface of cylindrical objects can be examined using rotational scanning.

While the various embodiments are illustrated using a wooden structure to rotate a maze or any object of concern, the embodiments can be extended to rotate and capture images of multiple objects simultaneously or sequentially in a fast manner using any suitable material. For example, the objects can be rotated on a conveyer belt that is configured to slowly rotate the object while taking pictures of the object as it rotates. In some embodiments, two cylindrical rollers can be placed in parallel, with the object placed on top of the cylindrical rollers and rotated under a capturing camera. In some embodiments, the object rolls down an inclined slope, and a camera follows the rotating object to capture the video. In another example, multiple structures as shown in FIG. 1 can be arranged to test a sample of objects. Statistical analysis is then performed to identify the characteristics of the objects. In some embodiments, the object (e.g., maize ear) is installed in the apparatus of FIG. 1 using automation such as a robotic arm. As such, the entire process of picking a maize ear, placing it on the conveyer or apparatus of FIG. 1 can be automated. In various embodiments, the rotation speed of the motor that rotates the object (e.g., maize ear) is programmable. In some embodiments, the capture rate of the camera is programmable and adjusted according to the speed of rotation of the object. This is done to capture each face of the object to create a two-dimensional object image. A local computer (having a processor) or cloud computing environment can be used to adjust the rotation speed and/or camera frame rate or capture rate.

Figure 3:
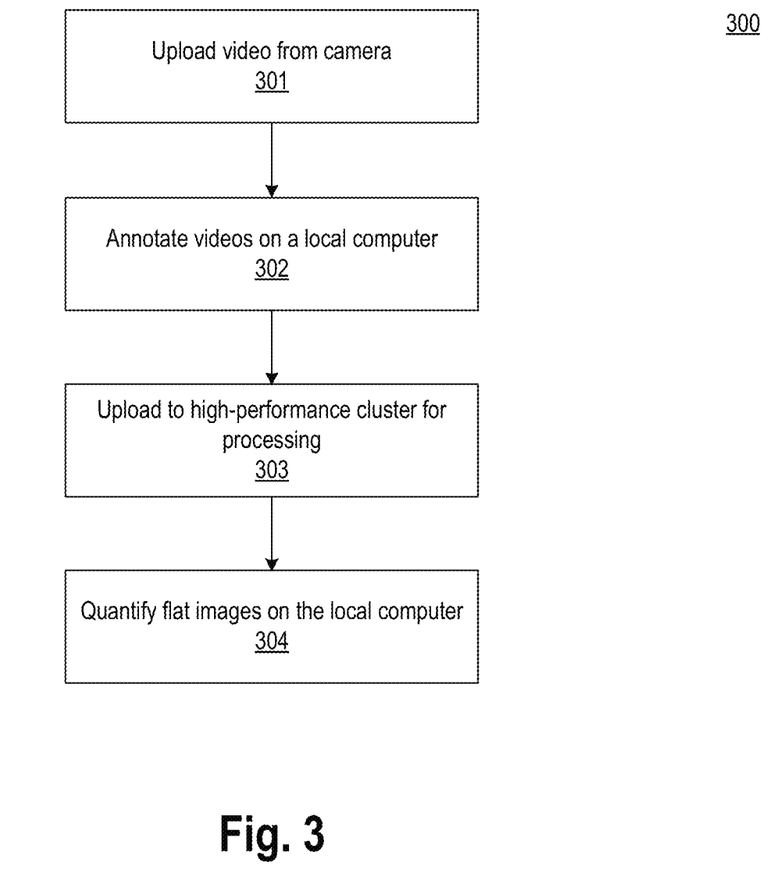
FIG. 3 illustrates a flowchart of a method for processing videos into flat ear projections.

FIG. 3 illustrates flowchart 300 of a method for processing videos into flat ear projections. While various blocks are shown in a particular order, the order can be modified. For example, some blocks may be performed before others while some blocks may be performed in parallel. The blocks can be performed by hardware, software, or a combination of them.

Some embodiments provide a methodology that uses hardware and/or software to capture some of this information via digital imaging to facilitate downstream quantitative analyses. Through capturing a video of a rotating ear, a flat image of the surface of the ear can be created that enables standardized, replicable phenotyping of seed marker distribution, as well as providing a permanent digital record of ears. Scanner apparatus 100 of some embodiments is fast, cost-effective, and capable of bringing digital image phenotyping to any lab interested in maize ears, dramatically scaling up the amount of quantitative data that can be feasibly generated. However, the embodiments are not limited to a particular structure of a scanning apparatus. As discussed herein, various other structures can be used to capture data and analyze the data of multiple ears.

At block 301, video(s) are uploaded from one or more cameras to a computer, a server, a computing distribution network, or a cloud. The one or more cameras capture images of the one or more ears as they rotate on rollers or shafts. At block 302, the one or more videos are annotated with identifying metadata. Videos are annotated on a local computer or a cloud computing environment, followed by generation of the projection (flat image) via processing either on the same computer or on a high-performance computing cluster for speed improvements. Flat images are small in size, and can be quantified on a local computer or the cloud computing environment.

At block 303, videos are transferred to a high-performance computing cluster (e.g., cloud) to be processed for generation of the projections. In alternative embodiments, the processing can happen on a local computer. After processing, the resulting flat images are transferred back to a local computer or a cloud computing environment for assessment and quantification as indicated by block 304.

Capturing video data from ears produces a lasting record of experiments. These data can be used in a variety of ways, such as measuring patterns of seed distribution, quantifying empty space on the ear, and recording other phenotypes such as abnormal or aborted seeds. By recording ear data, future-proofs experiments may benefit from yet-undeveloped methods of quantification. One quantification method is automated seed counting. Hand annotation of seeds on ear projections using, for example, ImageJ, is significantly faster than marking seeds on the ear, but remains a time-consuming and tedious process. However, the resulting data can be used to train machine-learning models to identify seeds. As these models are developed, they will dramatically accelerate the phenotyping process.

Figure 4:
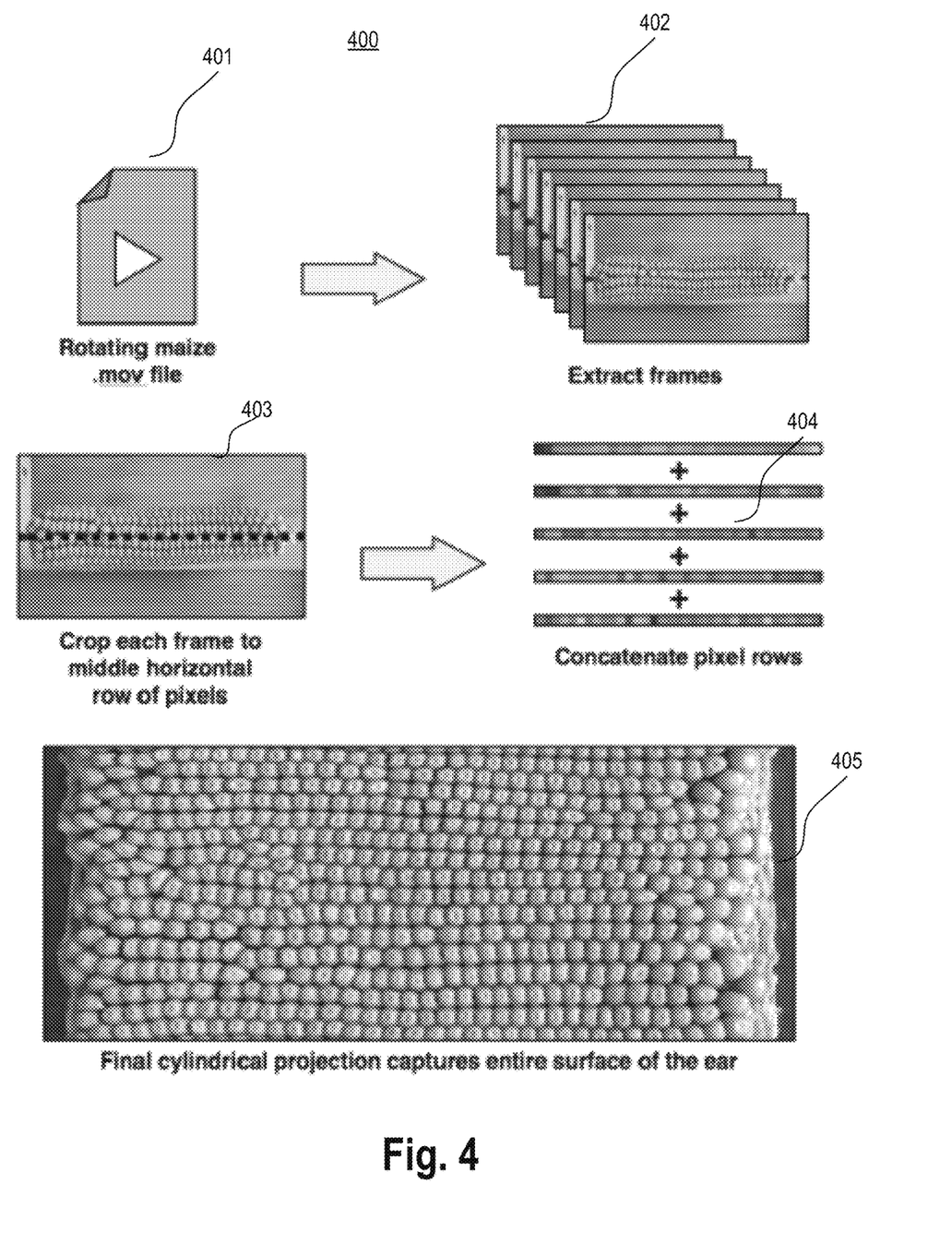
FIG. 4 illustrates a video processing operation that results in capturing an entire surface of the ear, in accordance with some embodiments.

FIG. 4 illustrates a video processing operation 400 that results in capturing an entire surface of the ear, in accordance with some embodiments. After videos are imported to a computer, they are processed to flat images. Frames are first extracted from videos to, for example, png formatted images, using the command line utility e.g., FFmpeg_ (https://ffmpeg.org) with default options (ffmpeg-i-/"$file"-threads 4./maize_processing_folder/output_%04d.png). These images are then cropped to the central row of pixels using the command line utility, for example, ImageMagick (https://imagemagick.org/) (mogrify_-verbose-crop 1920× 1+0+540+repage./maize_processing_folder/*.png). The collection of single pixel row images is then appended in sequential order (convert-verbose-append_+repage./ maize_processing_folder/*.png./"$name.png"). Finally, the image is rotated and cropped (mogrify-rotate "180"+repage./"$name.png"; mogrify-crop 1920×7 46+0+40+repage./ "$name.png").

Here, the convention of a horizontal flattened image with the top of the ear to the right and the bottom of the ear to the left is chosen. Because in this example the videos are captured vertically, a rotation is used after appending the individual frames. Depending on the users, video capture orientation, and desired final image orientation, some modification may be made. The dimensions of the final crop of the image depend both on the rotation speed and the video frame rate. It may not be necessary to capture one exact rotation, as long as the video captures at least one rotation. If the ears rotate at a consistent speed, one full rotation may always be the same number of frames.

Because each frame becomes one pixel in height, the image can be cropped to a height corresponding to the number of frames that encompass one rotation. Because rotation speeds and frame rates vary, it is recommended that the user records the dimensions of an ear and compares those dimensions to the final output to ensure that there is no distortion. The final crop can be adjusted to address any possible distortion. For very high frame rates, the FFmpeg frame extraction rate can also be adjusted using the -vf option and adjusting the playback frames per second (e.g. to extract 10 frames per second: -vf fps=10). In one example, a GitHub repository containing the script used to create flat images from videos is located at https://github.com/fowler-lab-osu/flatten_all_videos_in_pwd.

Seeds are quantified from flat ear images using, for example, the Cell Counter plugin of the FIJI distribution of ImageJ (Schindelin et al., 2012). Ears are assigned counter types to correspond to different seed markers, after which seeds on ear images were located and annotated by hand. The Cell Counter plugin exports results to an xml file, which contains the coordinates and marker type of every annotated seed. This file can be processed to create a map of sees locations on the ear.

At operation 401, the video file is retrieved. The video file can be any suitable format (e.g., .mov file). At operation 402, frames are extracted from the video into separate images. For example, using the command line utility, e.g., FFmpeg. At operation 403, images are cropped to the center horizontal row of pixels of the ear image. In one example, the cropped image can be extracted using the command line utility, e.g., ImageMagick. As the ear is rotated, the center horizontal row of pixels is cropped resulting in a plurality of center horizontal row of pixels. At operation 404, all rows of pixels, one from each frame, are appended sequentially, resulting in the final image. For example, the resulting collection of pixel rows, one per frame, is concatenated into a single image depicting the entire surface of the ear. Operation 405 illustrates a flat image of the ear. When multiple ears or cylindrical objects are being accessed, flat images of each object or ear is made.

Figure 5:
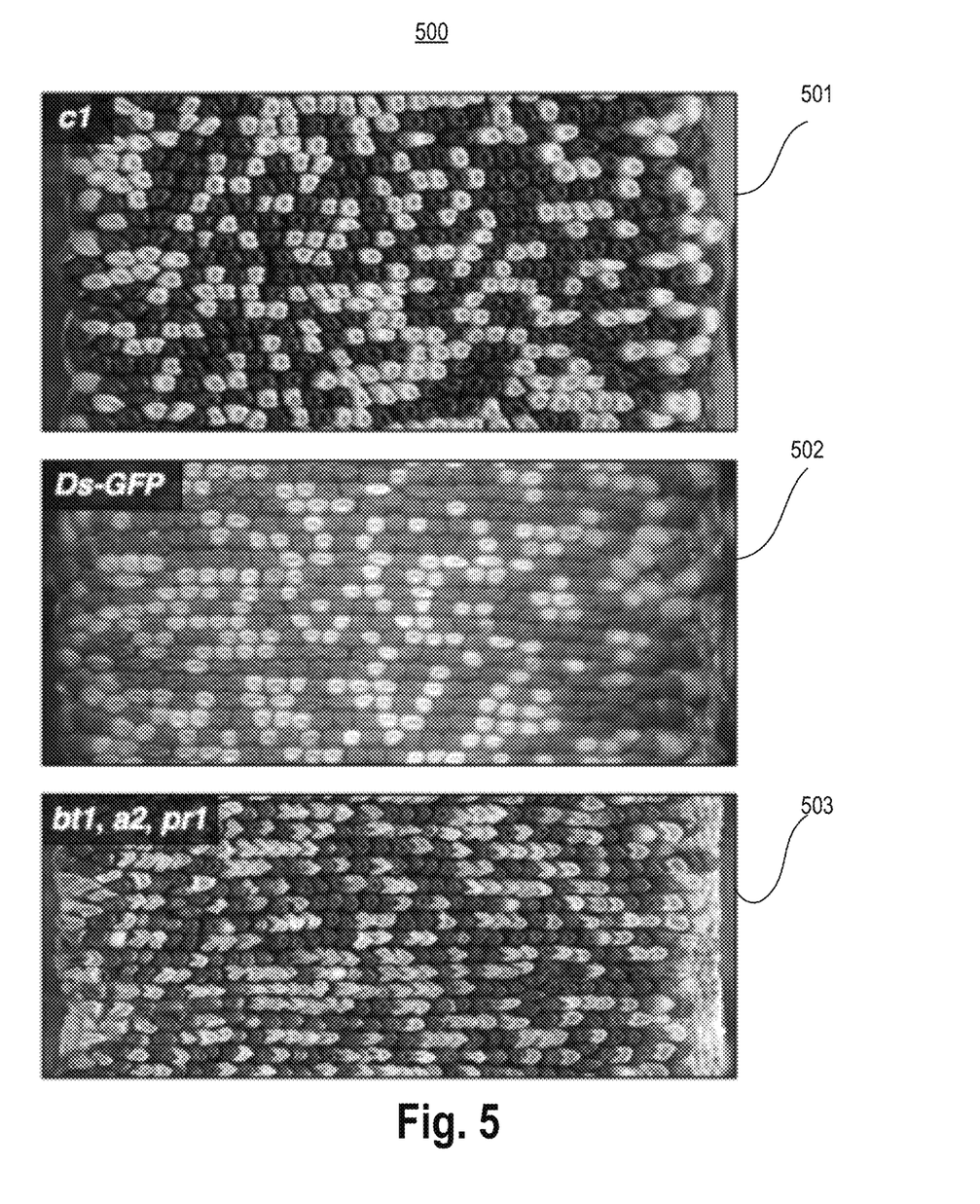
FIG. 5 illustrates representative ear projections demonstrating ease of visibility and tracking for several widely-used maize seed markers, in accordance with some embodiments.

FIG. 5 illustrates a set of photos 500, representative of ear projections demonstrating ease of visibility and tracking for several widely-used maize seed markers, in accordance with some embodiments. In one example, the scanning apparatus is tested using a variety of maize ears representing several widely used seed markers as illustrated by images 501, 502, and 503. FIG. 5 illustrates representative ear projections demonstrating ease of visibility and tracking for several widely-used maize seed markers. From top to bottom: c1 (image 501); Ds-GFP (impage 502); bt1/a2/pr1 (image 503) show linked markers on chromosome 5. Both anthocyanin in image 501 (c1) and fluorescent in image 502 (0 s-GFP), seed markers are easily distinguishable in the final images, as well as other markers such as bt1, a2, and pr1 in image 503. Color and fluorescent seed markers are manually quantified, in this example, on the digital projections using the FIJI distribution of ImageJ. However, an automated process can be used. Seed markers are not limited to those that were previously described, but can include markers in maize genes such as dek32, bz2, nm1, brn1, sh2, su1, y1, or wc1, or any other markers which cause defective or variably colored seeds that can be seen with visible light images. Additional markers can be seen with a hyperspectral camera, such as wx1.

Cylindrical projections are a convenient way of visualizing the entire surface of an ear in a single image. However, because maize ears are not perfect cylinders, the projections distort regions of the ear that are not cylindrical, typically the top and bottom, resulting in seeds that appear larger than those in the middle of the ear (FIG. 5). Because of these distortions, measuring qualities like seed and ear dimensions can be challenging. While approximate values for these metrics can be calculated, in the future, more precise measurements can potentially use the source video as input to model the ear in three dimensions. In addition, curved ears become highly distorted when scanned, using this method. In this example, the use of the projections is limited to relatively straight, uniform-thickness ears.

Figure 6:
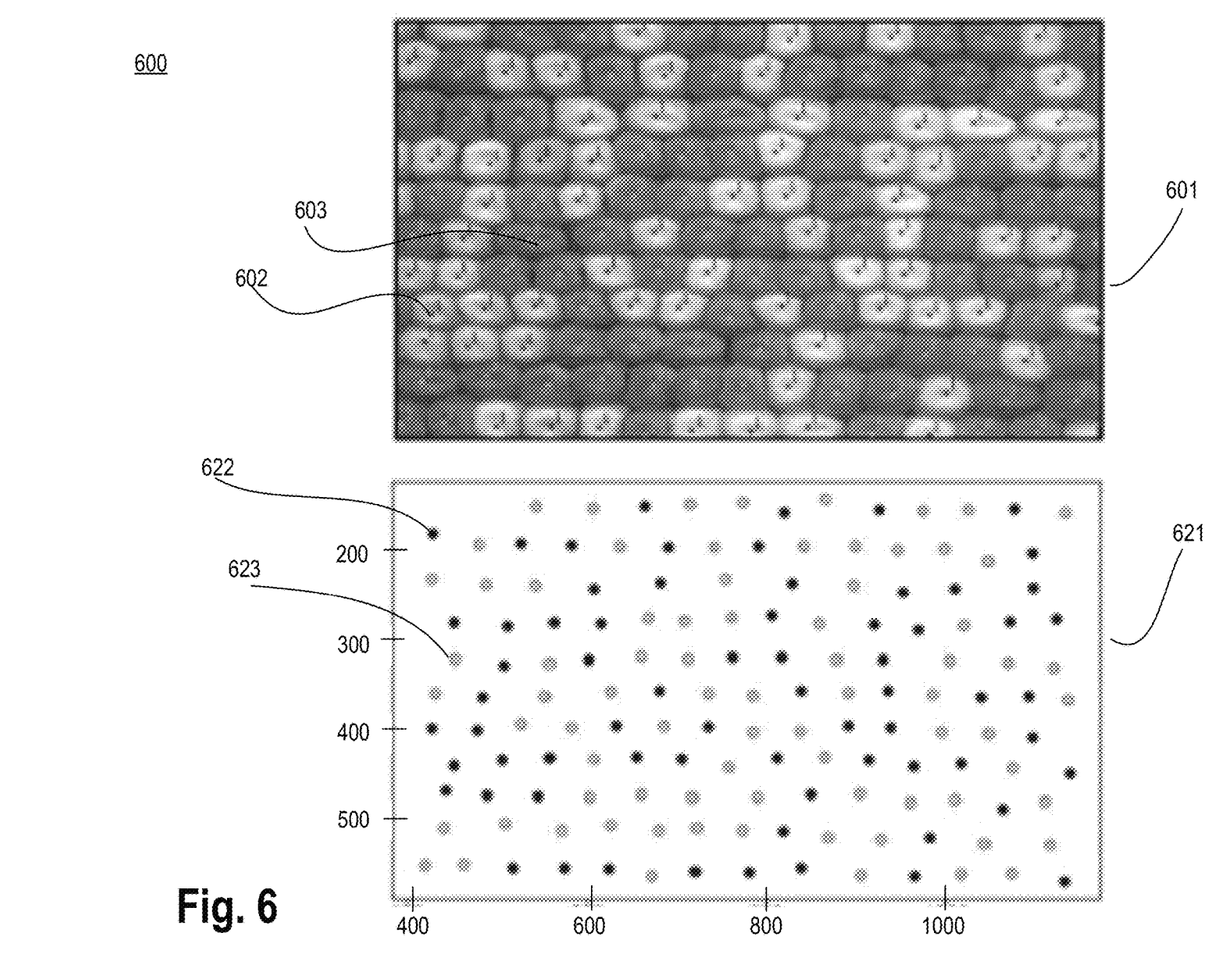
FIG. 6 illustrates a set of images showing seed phenotypes, in accordance with some embodiments.

FIG. 6 illustrates a set of images 600 showing seed phenotypes, which are annotated on the ear image 601 (detail top), allowing quantification of relative transmission of each marker. In this process, seed location (e.g., x, y coordinate) as well as marker identities (e.g., 602 and 603) are recorded in an output file (e.g., an xml file), allowing for downstream analysis of seed distributions as shown in image 621 (bottom), in accordance with some embodiments. Image 621 shows a seed distribution for the two types of marker identities 622 (for 602) and 623 (for 603). Here, x-axis and y-axis are number of seeds. Using this approach, annotation of an entire ear can be completed in a short while (e.g., 1 to 5 minutes manually and less than 1 minute with automation), depending on the size of the ear. In addition to producing total quantities of each seed marker, this process results in coordinates for each annotated seed, which can be further analyzed if desired.

Figure 7:
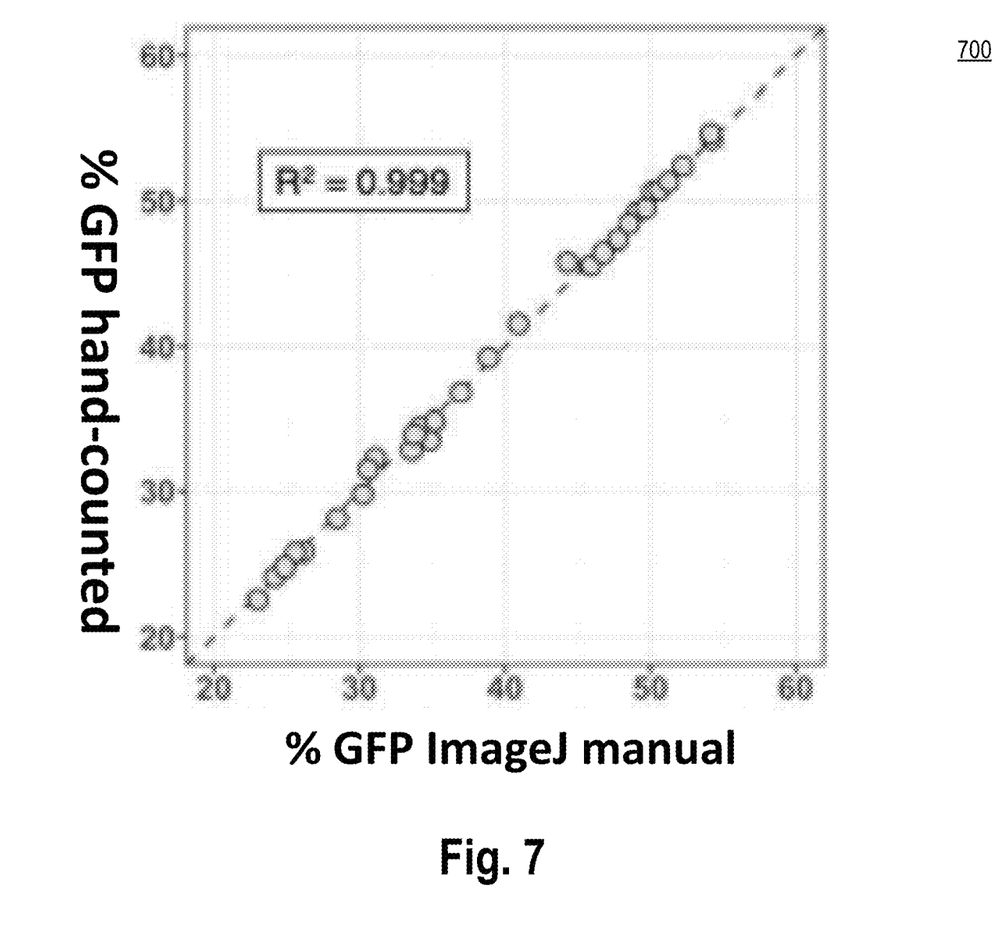
FIG. 7 illustrates a plot showing comparison of manually counting seeds on ears versus manually counting seeds from images.

FIG. 7 illustrates plot 700 showing comparison of counting seeds on ears versus counting seeds from images. In one example, annotations of scanner images are compared to counting the seeds on the ear. A strong correlation is observed between these two methods (e.g., $R^2 > 0.999$), validating the scanner method.

Figure 8A:
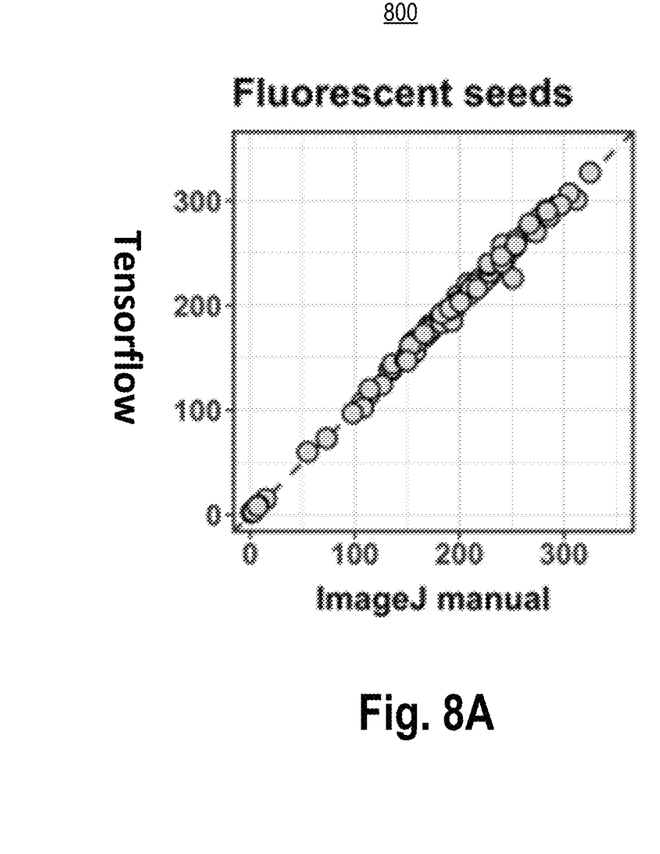
FIGS. 8A-B illustrate plots showing computer vision pipeline examples.
Figure 8B:
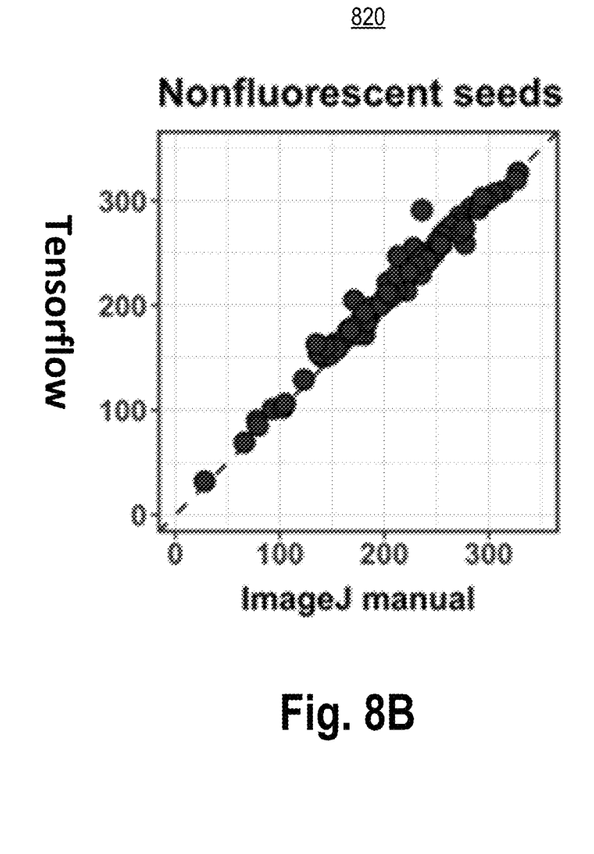

FIGS. 8A-B illustrate plots 800 and 820, respectively, showing computer vision pipeline examples comparing manual counts to computer-predicted counts for ~100 test images (fluorescent $R^2 = 0.994$, nonfluorescent $R^2 = 0.981$). To test the utility of the maize ear scanner, in one example, over 400 ears are scanned and quantified with marker-linked mutations in greater than 50 genes. With these methods (e.g., hand annotation using ImageJ), weak but significant transmission defects (e.g., ~45% transmission of a marker-linked mutation) are detected for a number of mutant alleles, using both anthocyanin and GFP seed markers.

Figure 9:
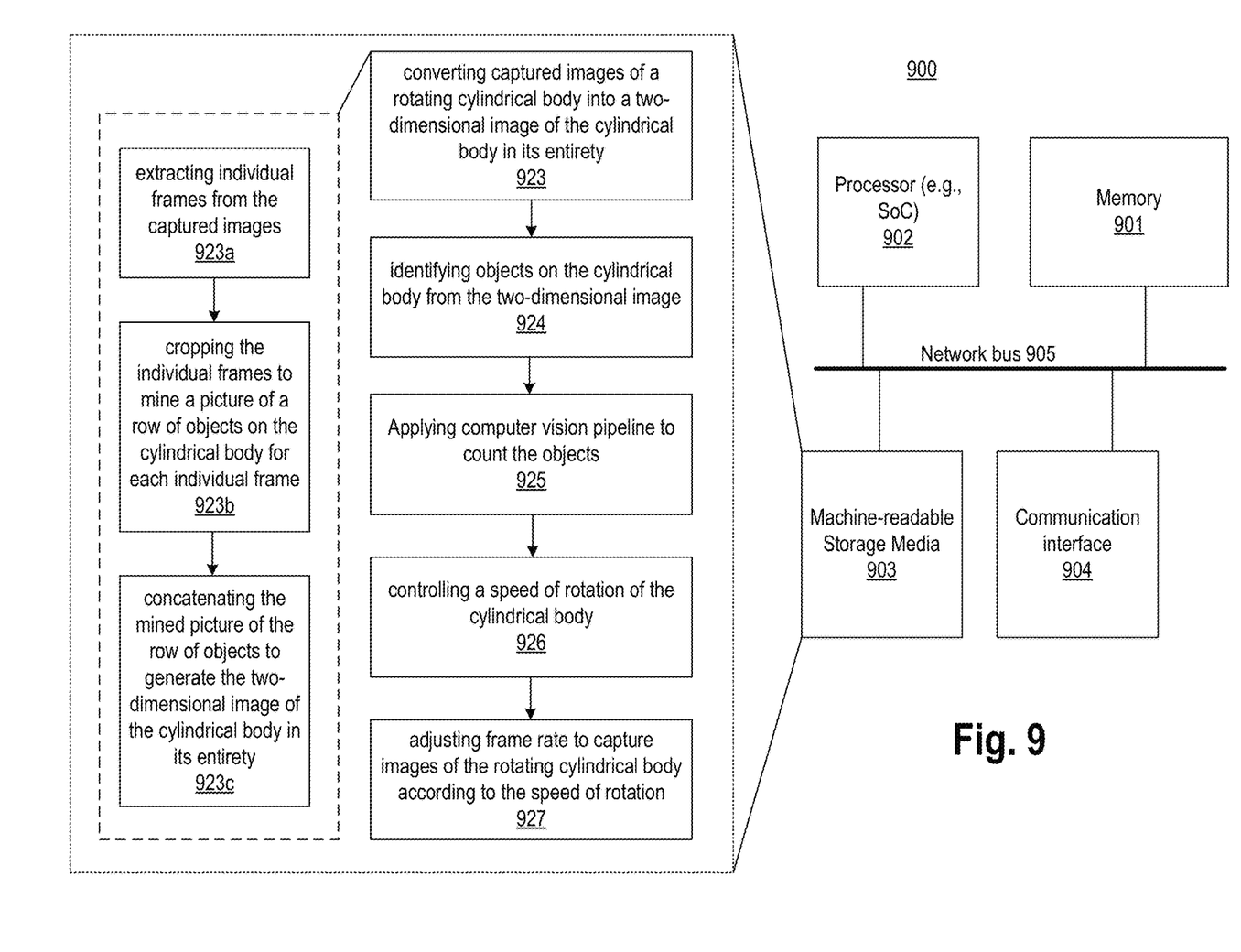
FIG. 9 illustrates a simplified computer system for executing a method for identifying characteristics of objects on a cylindrical body, in accordance with some embodiments.

FIG. 9 illustrates a simplified computer system 900 for executing the flowchart, in accordance with some embodiments. Elements of embodiments are also provided as a machine-readable medium (e.g., memory) for storing the computer-executable instructions (e.g., instructions to implement any other processes discussed herein). In some embodiments, the computing platform comprises memory 901, processor 902, machine-readable storage media 903 (also referred to as tangible machine readable medium), communication interface 904 (e.g., wireless or wired interface), and network bus 905 coupled together as shown.

In some embodiments, processor 902 is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via network bus 905. Any suitable protocol may be used to implement Network Bus 905. In some embodiments, machine readable storage medium 903 includes instructions (also referred to as the program software code/instructions) for calculating or measuring distance and relative orientation of a device with reference to another device as described with reference to various embodiments and flowchart.

Program software code/instructions associated with the methods and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with various embodiments are executed by the computing system.

In some embodiments, the machine-readable storage media 903 includes machine readable instructions stored thereon that when executed causes a machine or processor 902 to perform a method for identifying characteristics of objects on a cylindrical body. In some embodiments, the method comprises operation 923 which includes converting captured images of a rotating cylindrical body into a two-dimensional image of the entire cylindrical body. In some embodiments, the method comprises operation 924 which includes identifying objects on the cylindrical body from the two-dimensional image. In some embodiments, the method of converting the captured images into the two-dimensional image comprises operations 923a, 923b, and 923c. In operation 923a, the method comprises extracting individual frames from the captured images. In operation 923b, the method comprises cropping the individual frames to mine a picture of a row of objects on the cylindrical body for each individual frame. In operation 923c, the method comprises concatenating the mined picture of the row of objects to generate the two-dimensional image of the cylindrical body in its entirety.

In some embodiments, the method comprises operation 925 which includes applying computer vision pipeline to count the objects. The computer vision pipeline comprises a convolutional neural network for object detection. The network (e.g., Faster region based convolutional neural network (R-CNN) with Inception Resnet v2 and Atrous convolutions, implemented in the Tensorflow Object Detection API) is trained using transfer learning from the Collection of Common Objects (COCO) dataset and using hand-labeled ear projections outputted by the apparatus to retrain the top layers of the model. Images are split into sub-images (three per input image) before training and inference to reduce graphics process unit (GPU) load. Inference predicts bounding boxes and class labels for all kernels on an ear.

In some embodiments, the cylindrical body is a maize ear, and wherein the objects are seeds on the maize ear. In some embodiments, the method comprises identifying the objects includes identifying color of the seeds and position of the seeds in the maize ear. In some embodiments, the method comprises operation 926 which includes controlling a speed of rotation of the cylindrical body. In some embodiments, the method comprises operation 927 which includes an adjusting frame rate to capture images of the rotating cylindrical body according to the speed of rotation.

In some embodiments, the program software code/instructions associated with various flowcharts are stored in a computer executable storage medium and executed by processor 902. Here, computer executable storage medium 903 is a tangible machine-readable medium that can be used to store program software code/instructions and data that, when executed by a computing device, causes one or more processors (e.g., processor 902) to perform a method(s) as may be recited in one or more accompanying claims directed to the disclosed subject matter.

The tangible machine-readable medium 903 may include storage of the executable software program code/instructions and data in various tangible locations, including for example, ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 903 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 903 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Nexus®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

Various embodiments are described as examples. The examples can be combined in any suitable manner. For instance, example 5 can be combined with example 3 and/or example 7.

Example 1: A method for identifying characteristics of objects on a cylindrical body, the method comprising: capturing images of a rotating cylindrical body; converting the captured images into a two-dimensional image of the cylindrical body in its entirety; and identifying objects on the cylindrical body from the two-dimensional image, wherein converting the captured images into the two-dimensional image comprises: extracting individual frames from the captured images; cropping the individual frames to mine a picture of a row of objects on the cylindrical body for each individual frame; and concatenating the mined picture of the row of objects to generate the two-dimensional image of the cylindrical body in its entirety.

Example 2: The method of example 1 comprising applying computer vision pipeline to count the objects.

Example 3: The method of example 1, wherein the cylindrical body is a maize ear, and wherein the objects are seeds on the maize ear.

Example 4: The method of example 3, wherein identifying the objects includes identifying color of the seeds and position of the seeds in the maize ear.

Example 5: The method of example 1, wherein concatenating the mined picture of the row of objects to generate the two-dimensional image of the cylindrical body in its entirety comprises concatenating the mined picture of the row of objects sequentially.

Example 6: The method of example 1, wherein the rotating cylindrical body rotates at a constant speed.

Example 7: The method of example 1, comprising: controlling a speed of rotation of the cylindrical body; and adjusting frame rate to capture images of the rotating cylindrical body according to the speed of rotation.

Example 8: A machine-readable storage media having machine readable instructions stored thereon that when executed causes a machine to perform a method for identifying characteristics of objects on a cylindrical body, the method comprising: converting captured images of a rotating cylindrical body into a two-dimensional image of the cylindrical body in its entirety; and identifying objects on the cylindrical body from the two-dimensional image, wherein converting the captured images into the two-dimensional image comprises: extracting individual frames from the captured images; cropping the individual frames to mine a picture of a row of objects on the cylindrical body for each individual frame; and concatenating the mined picture of the row of objects to generate the two-dimensional image of the cylindrical body in its entirety.

Example 9: The machine-readable storage media of example 8 having machine readable instructions stored thereon that when executed causes the machine to perform a further method for identifying characteristics of objects on a cylindrical body, the method comprising: applying computer vision pipeline to count the objects.

Example 10: The machine-readable storage media of example 8, wherein the cylindrical body is a maize ear, and wherein the objects are seeds on the maize ear.

Example 11: The machine-readable storage media of example 10, wherein identifying the objects includes identifying color of the seeds and position of the seeds in the maize ear.

Example 12: The machine-readable storage media of example 8 having machine readable instructions stored thereon that when executed causes the machine to perform a further method for identifying characteristics of objects on a cylindrical body, the method comprising: controlling a speed of rotation of the cylindrical body; and adjusting frame rate to capture images of the rotating cylindrical body according to the speed of rotation.

Example 13: An apparatus for identifying characteristics of objects on a cylindrical body, the apparatus comprising: a shaft to rotate the cylindrical body; a camera to capture images of the cylindrical body as it rotates; a processor communicatively coupled to the camera, wherein the processor is to: convert the captured images into a two-dimensional image of the cylindrical body in its entirety; and identify the objects on the cylindrical body from the two-dimensional image.

Example 14: The apparatus of example 13, wherein the processor is to apply computer vision pipeline to count the objects.

Example 15: The apparatus of example 13, wherein the cylindrical body is a maize ear, and wherein the objects are seeds on the maize ear.

Example 16: The apparatus of example 15, wherein the processor is to identify the objects including color of the seeds and position of the seeds in the maize ear.

Example 17: The apparatus of example 13 wherein the processor is to convert the captured images into the two-dimensional image by an operation which comprises: extract individual frames from the captured images; crop the individual frames to mine a picture of a row of objects on the cylindrical body for each individual frame; and concatenate the mined picture of the row of objects to generate the two-dimensional image of the cylindrical body in its entirety.

Example 18: The apparatus of example 13 comprises a motor to rotate the shaft.

Example 19: The apparatus of example 13, wherein the processor is to: control a speed of rotation of the cylindrical body; and adjust a frame rate to capture images of the cylindrical body according to the speed of rotation.

Example 20: The apparatus of example 13, wherein the processor is in a cloud computing environment.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus for identifying characteristics of objects on a cylindrical body, the apparatus comprising:
    a frame;
    a first rail attached to the frame;
    a second rail attached to the frame, wherein the second rail is parallel to the first rail, wherein the second rail is across the first rail;
    a rack slidable along the first rail and the second rail, wherein the rack includes a first structure slidable along the first rail, wherein the rack includes a second structure slidable along the second rail, and wherein the rack comprises a third structure which is orthogonally connected to the first structure and the second structure;
    a pedestal with a housing, wherein the pedestal is coupled to a base, which is attached to the frame;
    a shaft to rotate the cylindrical body, wherein the shaft has a first end which is coupled to the third structure of the rack, wherein the shaft has a second end which is coupled to the pedestal such that the cylindrical body is to rotate between the third structure of the rack and the pedestal, and wherein the shaft moves away from the pedestal as the rack slides on the first rail and the second rail away from the pedestal;
    a camera to capture images of the cylindrical body as it rotates; and
    a processor communicatively coupled to the camera, wherein the processor is to:
        convert the images into a two-dimensional image of the cylindrical body in its entirety; and
        identify the objects on the cylindrical body from the two-dimensional image.

2. The apparatus of claim 1, wherein the processor is to apply a computer vision pipeline to count the objects.

3. The apparatus of claim 1, wherein the cylindrical body is a maize ear, and wherein the objects are seeds on the maize ear.

4. The apparatus of claim 3, wherein the processor is to identify the objects including color of the seeds and position of the seeds in the maize ear.

5. The apparatus of claim 1 wherein the processor is to convert the images into the two-dimensional image by an operation which comprises:
    extract individual frames from the images;
    crop the individual frames to mine a picture of a row of objects on the cylindrical body for each individual frame; and
    concatenate the picture, which is mined, of the row of objects to generate the two-dimensional image of the cylindrical body in its entirety.

6. The apparatus of claim 1 comprises a motor to rotate the shaft, wherein the motor is positioned in the pedestal.

7. The apparatus of claim 1, wherein the processor is to:
    control a speed of rotation of the cylindrical body; and
    adjust a frame rate to capture the images of the cylindrical body according to the speed of rotation.

8. The apparatus of claim 1, wherein the processor is in a cloud computing environment.

9. The apparatus of claim 5, wherein the processor is to concatenate the picture of the row of objects sequentially.

10. The apparatus of claim 6, wherein the motor is to rotate the shaft at a constant speed.

11. The apparatus of claim 1, wherein the shaft is coupled to pillow block bearing.

12. The apparatus of claim 1, wherein the shaft includes a pin to penetrate the cylindrical body, wherein the pin is mounted on a pillow block bearing.

13. The apparatus of claim 1, wherein the shaft is long enough to couple two or more cylindrical body through the shaft.

14. The apparatus of claim 1, wherein the camera is coupled to an orange filter to partially filter out non-green fluorescent protein wavelength.

15. The apparatus of claim 1, wherein the cylindrical body is illuminated with a blue light.

* * * * *